US011106887B1

(12) United States Patent
Cheng et al.

(10) Patent No.: US 11,106,887 B1
(45) Date of Patent: Aug. 31, 2021

(54) ELECTRONIC CIRCUIT AND A METHOD FOR GENERATING A FINGERPRINT IMAGE

(71) Applicant: Novatek Microelectronics Corp., Hsinchu (TW)

(72) Inventors: Huan-Teng Cheng, Hsinchu (TW); Yuan Heng Lu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/143,108

(22) Filed: Jan. 6, 2021

Related U.S. Application Data (60) Provisional application No. 63/021,662, filed on May 7, 2020.

(51) Int. Cl.
 *G06K 9/00* (2006.01)
(52) U.S. Cl.
 CPC .............................. *G06K 9/00026* (2013.01)

(58) Field of Classification Search
 None
 See application file for complete search history.

(56) References Cited

U.S. PATENT DOCUMENTS

| | | | |
|---|---|---|---|
| 2015/0102207 A1* | 4/2015 | Kurokawa | G01J 1/18 250/208.1 |
| 2017/0046558 A1* | 2/2017 | Li | G06K 9/0002 |
| 2017/0140201 A1* | 5/2017 | Li | G06K 9/00013 |

* cited by examiner

*Primary Examiner* — Nicholas J Lee
(74) *Attorney, Agent, or Firm* — JCIPRNET (57) ABSTRACT

An electronic circuit adapted to drive a display panel including a plurality of fingerprint sensing lines is provided. The electronic circuit includes a fingerprint sensing circuit. The fingerprint sensing circuit is configured to receive a fingerprint sensing signal corresponding to a fingerprint image from the fingerprint sensing lines. The fingerprint sensing signal includes a plurality of fingerprint image segments. The fingerprint sensing circuit rearranges the fingerprint image segments to generate the fingerprint image according to an order of the fingerprint sensing lines. In addition, a method for generating a fingerprint image is also provided.

10 Claims, 10 Drawing Sheets

ELECTRONIC CIRCUIT AND A METHOD FOR GENERATING A FINGERPRINT IMAGE

CROSS-REFERENCE TO RELATED APPLICATION

This application claims the priority benefit of U.S. Provisional application Ser. No. 63/021,662, filed on May 7, 2020. The entirety of the above-mentioned patent applications is hereby incorporated by reference herein and made a part of this specification.

BACKGROUND

Technical Field

The invention relates to an electronic circuit and a method for generating an image, more specifically, to an electronic circuit adapted to drive a display panel including touch sensors and fingerprint sensors, and a method for generating a fingerprint image.

Description of Related Art

In recent years, demands for fingerprint sensing have been gradually increased. In order to reduce a volume of an electronic device, a fingerprint sensing region may overlap with a display region of the electronic device. For example, an under-display fingerprint identification technique is to embed fingerprint sensors to a display panel, and the fingerprint sensor may sense or capture a fingerprint image through the display panel. When a touch event such as fingerprint identification happens, a touch sensing circuit may report it to an application processor of the electronic device via a specified interface. Next, the application processor further controls a display driving circuit to drive the display panel to display image for fingerprint sensing. On the other hand, the application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information.

However, for an electronic circuit capable of driving a display panel to perform a display operation, a touch sensing operation and a fingerprint sensing operation, a plurality of I/O pins and complex routing may be required between the electronic circuit and the display panel for signal transmission. The plurality of I/O pins and complex routing would increase the width of the fan-out area corresponding to the electronic circuit and the frame border size of the display panel near the electronic circuit.

On the other hand, the electronic circuit may include some I/O pins that are not connected to I/O pins of display panel. In this case, raw data of the fingerprint image may include fingerprint information that is required to be removed or rearranged.

SUMMARY

The invention is directed to an electronic circuit and a method for generating a fingerprint image, where the width of the fan-out area corresponding to the electronic circuit, and the frame border size of the display panel near the electronic circuit are small. In addition, a data remapping operation is performed to generate a fingerprint image.

An embodiment of the invention provides an electronic circuit adapted to drive a display panel including a plurality of fingerprint sensing lines. The electronic circuit includes a fingerprint sensing circuit. The fingerprint sensing circuit is configured to receive a fingerprint sensing signal corresponding to a fingerprint image from the fingerprint sensing lines. The fingerprint sensing signal includes a plurality of fingerprint image segments. The fingerprint sensing circuit rearranges the fingerprint image segments to generate the fingerprint image according to an order of the fingerprint sensing lines.

In an embodiment of the invention, the electronic circuit further includes a plurality of first pins. The display panel further includes a plurality of second pins connected to a first part of the first pins via transmission lines. The second part of the first pins is floating.

In an embodiment of the invention, the fingerprint image segments include interlaced image stripes. The fingerprint sensing circuit further removes the interlaced image stripes from the fingerprint image segments when the fingerprint sensing circuit rearranges the fingerprint image segments.

In an embodiment of the invention, the interlaced image stripes do not comprise fingerprint information.

In an embodiment of the invention, the second part of the first pins distributes between the first part of the first pins in an interlaced manner.

In an embodiment of the invention, the second part of the first pins collectively distributes between the first part of the first pins.

In an embodiment of the invention, the fingerprint image segments do not comprise interlaced image stripes.

An embodiment of the invention provides a method for generating a fingerprint image. The method includes: receiving a fingerprint sensing signal corresponding to a fingerprint image from fingerprint sensing lines of a display panel, where the fingerprint sensing signal includes a plurality of fingerprint image segments; and rearranging the fingerprint image segments to generate the fingerprint image according to an order of the fingerprint sensing lines.

In an embodiment of the invention, the fingerprint image segments include interlaced image stripes. The method further includes removing the interlaced image stripes from the fingerprint image segments when the fingerprint image segments are rearranged.

In an embodiment of the invention, the interlaced image stripes do not include fingerprint information.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
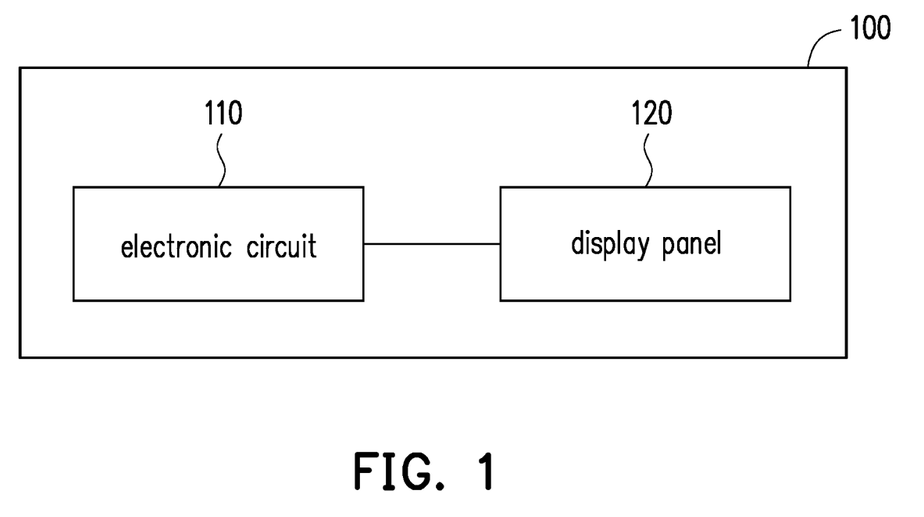
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes touch sensors and fingerprint sensors. The electronic circuit 110 is configurable to be coupled to the display panel 120. The electronic circuit 110 is adapted to drive the display panel 120.

In the present embodiment, the electronic device 100 may be an electronic device having a display function, a touch sensing function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
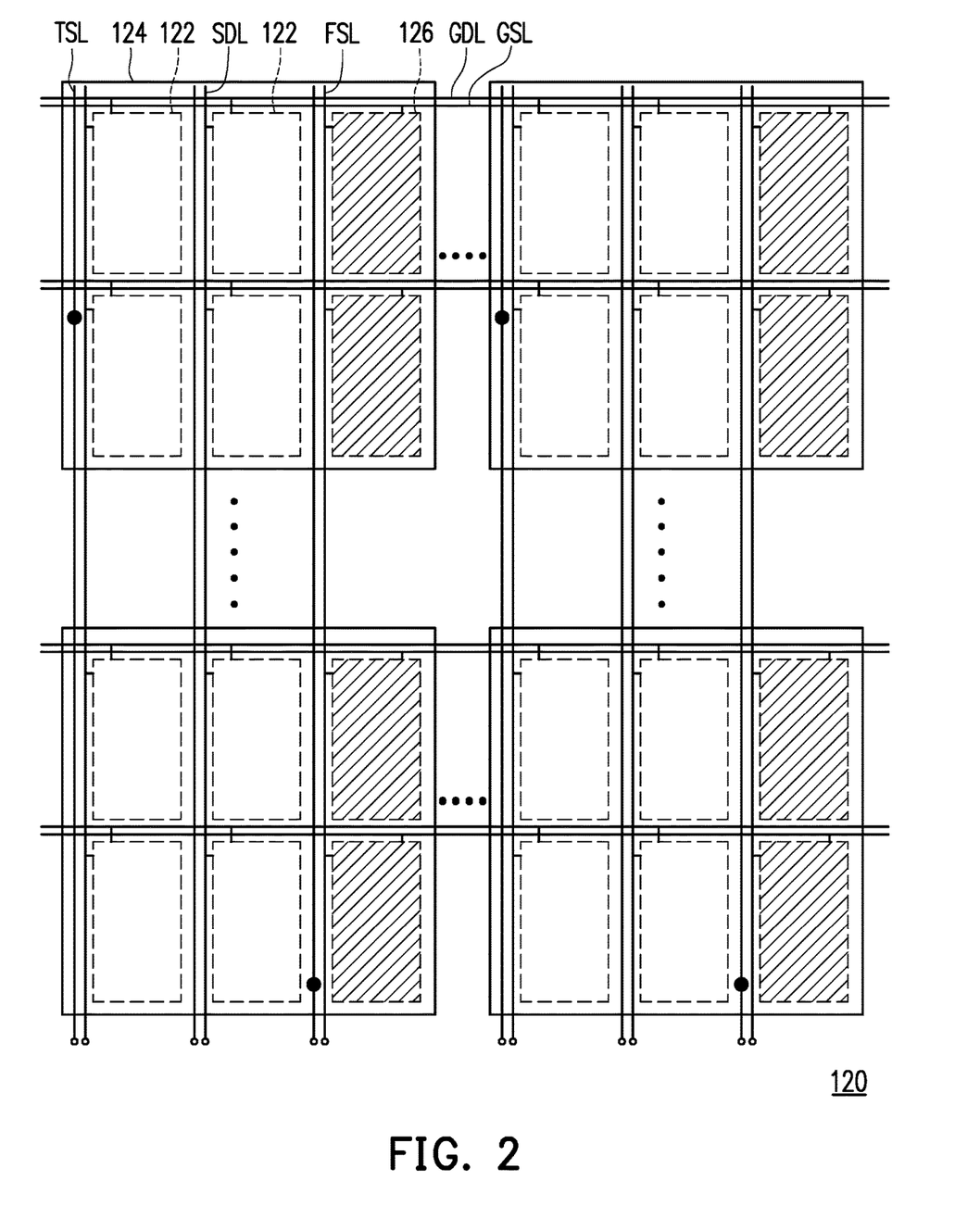
FIG. 2 is a schematic diagram illustrating the display panel depicted in FIG. 1.

FIG. 2 is a schematic diagram illustrating the display panel depicted in FIG. 1. Referring to FIG. 2, the display panel 120 of the present embodiment includes a plurality of display pixels 122, a plurality of touch sensors 124 and a plurality of fingerprint sensors 126. The electronic circuit 110 drives and controls the display panel 120 to perform a display operation, a touch sensing operation and a fingerprint sensing operation. To be specific, the electronic circuit 110 drives and controls the display pixels 122 to display images via display scan lines GDL and display data lines SDL. The electronic circuit 110 also drives and controls the touch sensors 124 to sense a touch event of the display panel 120 via touch scan lines and touch sensing lines TSL. In an embodiment, the touch sensors 124 may be touch sensing electrodes in a touch sensing phase, and the touch sensors 124 may be common electrodes in a display phase. In the present embodiment, in-cell touch sensors are depicted in FIG. 2 as an example. For the in-cell touch sensors, the display panel 120 inherently has no touch scan lines. For other type touch sensors, the display panel 120 may have touch scan lines for transmitting touch driving signals. In the embodiment of FIG. 2, the touch sensing lines TSL are also configured to transmit touch driving signals from the electronic circuit 110. The electronic circuit 110 also drives and controls the fingerprint sensors 126 to sense a fingerprint image on the display panel 120 via fingerprint scan lines GSL and fingerprint sensing lines FSL.

In an embodiment, the display panel 120 may be an in-cell fingerprint, touch and display panel that the fingerprint sensors and the touch sensors are embedded, but the invention is not limited thereto. In an embodiment, the electronic circuit 110 may drive and control the electronic device 100 to perform an in-display fingerprint identification operation, i.e. fingerprint recognition operation. In an embodiment, the fingerprint sensors 126 may be optical fingerprint sensors.

Figure 3:
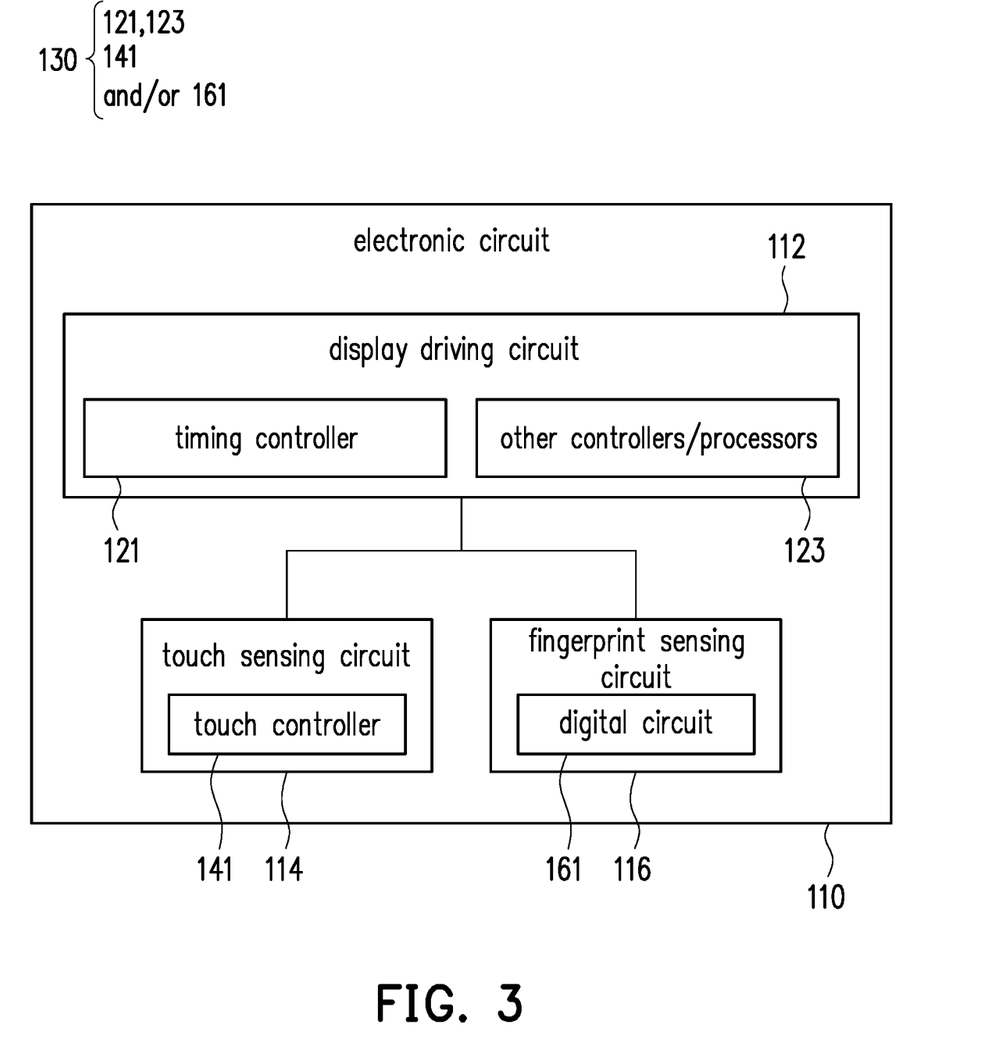
FIG. 3 is a schematic block diagram illustrating the electronic circuit depicted in FIG. 1.

FIG. 3 is a schematic block diagram illustrating the electronic circuit depicted in FIG. 1. Referring to FIG. 3, the electronic circuit 110 may include a display driving circuit 112, a fingerprint sensing circuit 116 and a touch sensing circuit 114. The display driving circuit 112 is configured to drive and control the display pixels 122 to display images via the display scan lines GDL and the display data lines SDL. The display driving circuit 112 generates display driving signals for driving the display data lines SDL of the display panel 120. The display driving circuit 112 may include a timing controller 121, a display driver and other functional circuits for the display operation. The display driving circuit 112 may also include other controllers or processors 123 for other control activities of the display operation. The touch sensing circuit 114 is configured to drive and control the touch sensors 124 to sense the touch event of the display panel 120 via the touch sensing lines TSL. The touch sensing circuit 114 may include a touch controller 141, an analog front end (AFE) circuit, an analog-to-digital converter (ADC) circuit and other functional circuits for the touch sensing operation. The fingerprint sensing circuit 116 is configured to drive and control the fingerprint sensors 126 to sense the fingerprint on the display panel 120 via the fingerprint scan lines GSL and the fingerprint sensing lines FSL. The fingerprint sensing circuit 116 receives fingerprint sensing signals corresponding to a fingerprint image from the fingerprint sensors 126 and may also process the fingerprint sensing signals to obtain the fingerprint image. The fingerprint sensing circuit 116 may include a digital circuit 161, an AFE circuit, an ADC circuit and other functional circuits for the fingerprint sensing operation.

In an embodiment, the electronic circuit 110 is implemented as a single semiconductor chip. When the electronic circuit 110 is implemented as a single-chip integrated circuit that can drive and control the display panel 120 to perform the display operation, the touch sensing operation and the fingerprint sensing operation, the electronic circuit 110 may include a control circuit 130, and the control circuit 130 may be a micro-controller based core to perform all of control activities of the display operation, the touch sensing operation and the fingerprint sensing operation. The control circuit 130 may include at least one of the timing controller 121, the touch controller 141, the digital circuit 161, and the other controllers or processors 123 of the display driving circuit 112.

The display driving circuit 112, the touch sensing circuit 114 and the fingerprint sensing circuit 116 communicate with one another via signal transmission interfaces, such as Mobile Industry Processor Interface (MIPI), Inter-Integrated Circuit (I2C) Interface, Serial Peripheral Interface (SPI) and/or other similar or suitable interfaces.

Regarding hardware structures of the components in the embodiment of FIG. 3, the timing controller 121, the touch controller 141 and the digital circuit 161 may be a processor having computational capability. Alternatively, the timing controller 121, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the display driving circuit 112, the touch sensing circuit 114 and the fingerprint sensing circuit 116 can be obtained with reference to common knowledge in the related art, which is not repeated hereinafter.

Figure 4:
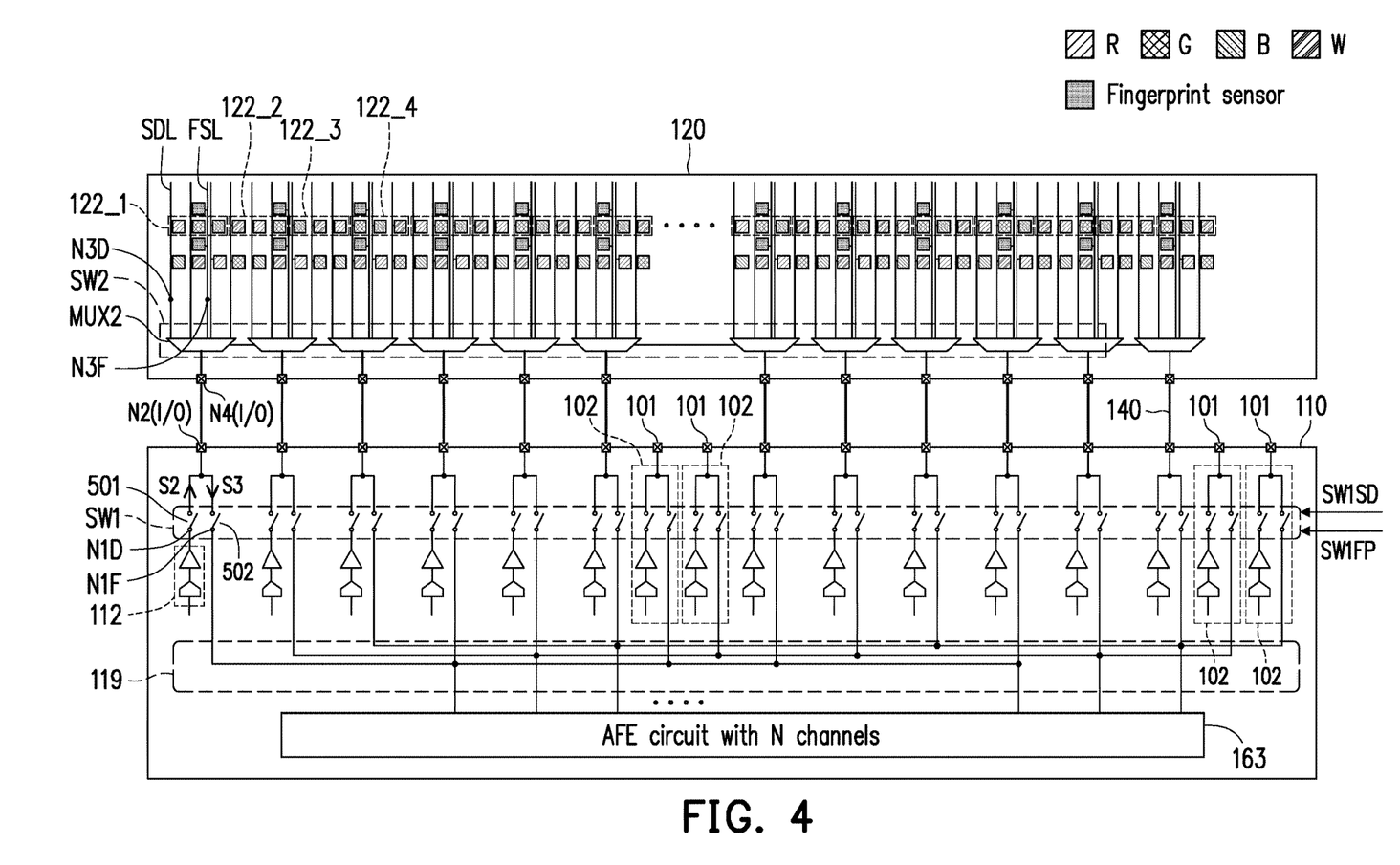
FIG. 4 is a schematic diagram illustrating a routing structure between the electronic circuit and the display panel according to an embodiment of the invention.

FIG. 4 is a schematic diagram illustrating a routing structure between the electronic circuit and the display panel according to an embodiment of the invention. Referring to FIG. 3 to FIG. 4, the electronic circuit 110 includes a switch circuit SW1. The display panel 120 includes a switch circuit SW2. The control circuit 130 is configured to generate control signals to control the operation of the switch circuits SW1 and SW2. The switch circuit SW1 is configurable to be coupled to the switch circuit SW2 via transmission lines 140. In the present embodiment, the switch circuit SW1 is disposed in the electronic circuit 110, and the display panel 120 does not include the switch circuit SW1. Therefore, the frame border size of the display panel 120 near the electronic circuit 110 is reduced.

In the electronic circuit 110, the switch circuit SW1 includes a plurality of first terminals N1D and N1F and a plurality of second terminals N2 (first pins). The number of the first terminals N1D and N1F is larger than the number of the second terminals N2. The first terminals N1D are coupled to the display driving circuit 112. In the present embodiment, the display driving circuit 112 includes an output buffer SOP and a signal converter DAC and outputs a display driving signal S2 for driving the display panel 120. The first terminals N1F are coupled to an AFE circuit 163 of the fingerprint sensing circuit 116 via a wire grouping circuit 119. The second terminals N2 are configurable to be coupled to the switch circuit SW2 of the display panel 120 via the transmission lines 140. The second terminals N2 may be input and output (I/O) pins of the electronic circuit 110.

In the present embodiment, the switch circuit SW1 includes a plurality of first switch elements 501 and a plurality of second switch elements 502. The first switch element 501 is coupled between the first circuit 112 and the second terminal N2. The first switch element 501 is controlled to transmit the display driving signal S2 to the display panel 120 by a control signal SW1SD in a display driving phase. The control signal SW1SD is asserted in the display driving phase. The second switch element 502 is coupled between the wire grouping circuit 119 and the second terminal N2. The second switch element 502 is controlled to receive a fingerprint sensing signal S3 from the display panel 120 and transmit the fingerprint sensing signal S3 to the AFE circuit 163 by a control signal SW1FP in a fingerprint sensing phase. The control signal SW1FP is asserted in the fingerprint sensing phase. In an embodiment, the second switch element 502 may be controlled to transmit the fingerprint sensing signal S3 to the AFE circuit 163 in response to a determination of a touch information in the fingerprint sensing phase.

In the present embodiment, the electronic circuit 110 outputs the display driving signal S2 to the display panel 120 and receive the fingerprint sensing signals S3 from the display panel 120 via the same I/O pin N2. The display driving signal S2 and the fingerprint sensing signal S3 are transmitted on the transmission lines 140 in different phases, and the transmission lines 140 are shared by the display driving signal S2 and the fingerprint sensing signal S3. The number of the I/O pins is less, and thus the routing is simple between the electronic circuit 110 and the display panel 120.

In the present embodiment, the electronic circuit 110 further includes the wire grouping circuit 119. The wire grouping circuit 119 is coupled between the switch circuit SW1 and the AFE circuit 163. The wire grouping circuit 119 is configured to wire-OR multiple fingerprint sensing lines FSL to each of the sensing channels in the AFE circuit 163. The second switch elements 502 are grouped into a plurality of groups and connected to the AFE circuit 163 through the wire grouping circuit 119. By grouping the second switch elements 502, the wire grouping circuit 119 groups the fingerprint sensing lines FSL into a plurality of groups, and the groups are correspondingly connected to the fingerprint sensing channels in the AFE circuit 163. Each group of the fingerprint sensing lines FSL corresponds to one fingerprint sensing channel. For example, the AFE circuit 163 may be designed to have 270 fingerprint sensing channels, and the number of the fingerprint sensing lines FSL is 1080. The 1080 fingerprint sensing lines are grouped into 270 groups.

In the display panel 120, the switch circuit SW2 includes a plurality of third terminals N3D and N3F and a plurality of fourth terminals N4 (second pins). The number of the third terminals N3D and N3F is larger than the number of the fourth terminals N4. The third terminals N3D are coupled to the display data lines SDL. The third terminals N3F are coupled to the fingerprint sensing lines FSL. The fourth terminals N4 are configurable to be coupled to the switch circuit SW1 of the electronic circuit 110 via the transmission lines 140. The fourth terminals N4 may be I/O pins of the display panel 120.

The switch circuit SW2 includes a plurality of switch units MUX2. The switch unit MUX2 is switched to receive the display driving signals S2 from the electronic circuit 110 in the display driving phase and switched to transmit the fingerprint sensing signals S3 to the electronic circuit 110 in the fingerprint sensing phase. The switch unit MUX2 may be a 1:5 multiplexer, for example.

In the present embodiment, the pixels 122_1, 122_2, 122_3 and 122_4 respectively include sub-pixels of different colors. For example, the pixel 122_1 includes a red sub-pixel R, a green sub-pixel G and a blue sub-pixel B, and the pixel 122_2 includes a white sub-pixel W, a red sub-pixel R and a green sub-pixel G. In addition, the data lines SDL coupled to the same switch unit MUX2 are connected to sub-pixels of four different colors that are arranged in the same row. For example, the data lines SDL coupled to the same first switch unit 125 are connected to a red sub-pixel R, a green sub-pixel G, a blue sub-pixel B and a white sub-pixel W that are arranged in the first pixel row. On the other hand, the data lines SDL coupled to the same first switch unit 125 are connected to a blue sub-pixel B, a white sub-pixel W, a red sub-pixel R and a green sub-pixel G, and the blue sub-pixel B that are arranged in the second pixel row. Pixel per inch (PPI) of display is not equal to dot per inch (DPI) of fingerprint recognition. The connection relationship of the data lines SDL and the sub-pixels are shown in FIG. 4, and therefore no further description is provided herein.

In the present embodiment, the electronic circuit 110 includes a plurality of first pins N2. The first pins N2 that are connected to the I/O pins N4 (second pins) of the display panel 120 serve as a first part of the first pins N2, and the first pins N2, i.e. I/O pins 101, that are not connected to the I/O pins N4 (second pins) of the display panel 120 serve as a second part of the first pins N2. To be specific, the I/O pins 101 of the electronic circuit 110 are floating and not connected to the I/O pins N4 of the display panel 120. Driving and sensing channels 102 of the electronic circuit 110 do not operate in the display driving phase and the fingerprint sensing phase. In the present embodiment, the second part of the first pins N2, i.e. I/O pins 101, distributes between the first part of the first pins N2 in an interlaced manner. For example, for every six I/O pins N2, there are two I/O pins 101 not connected to the I/O pins N4.

Since the driving and sensing channels 102 do not receive the fingerprint sensing signals S3, raw data of the fingerprint sensing signals S3 that the AFE circuit 163 receives may include some interlaced image stripes. The interlaced image stripes do not include fingerprint information. Therefore, a data remapping operation is performed to generate the fingerprint image in the disclosure.

Figure 5:
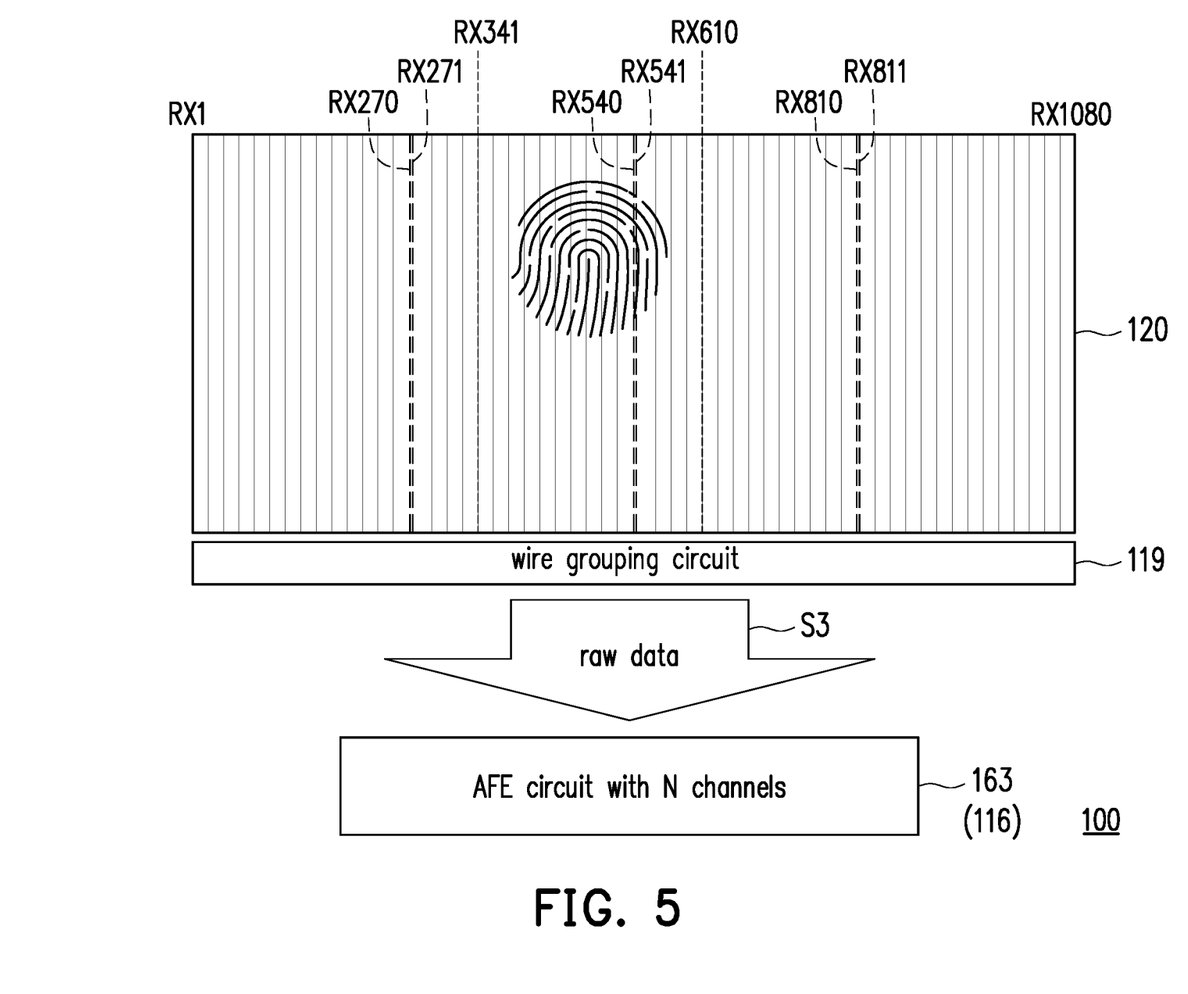
FIG. 5 and FIG. 6 are schematic diagrams illustrating the electronic device of FIG. 4 and a data remapping operation thereof according to an embodiment of the invention.
Figure 6:
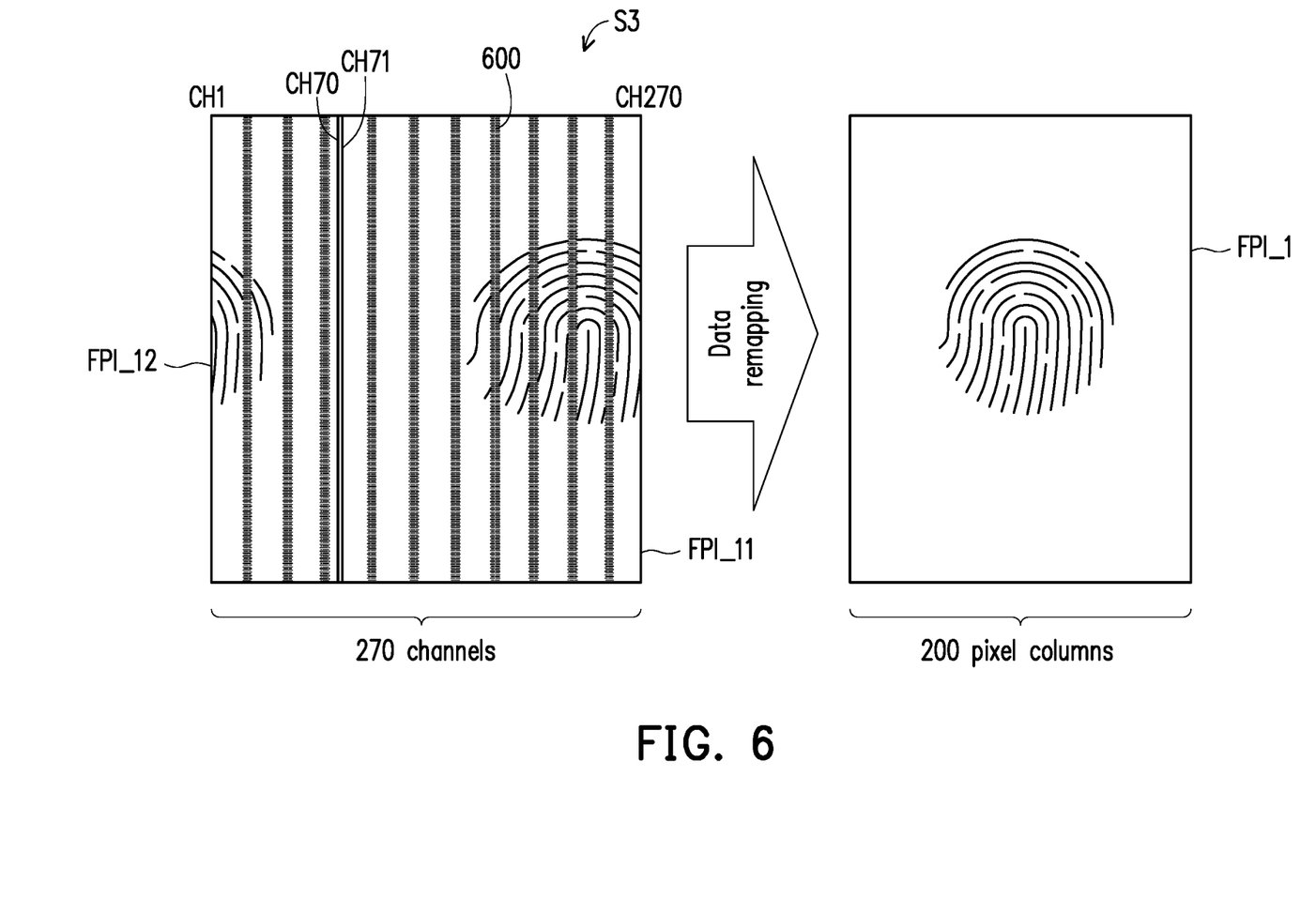

FIG. 5 and FIG. 6 are schematic diagrams illustrating the electronic device of FIG. 4 and a data remapping operation thereof according to an embodiment of the invention. Referring to FIG. 3 to FIG. 6, the fingerprint sensing circuit 116 is configured to receive the fingerprint sensing signal S3 corresponding to a fingerprint image FPI_1 from the fingerprint sensing lines RX341 to RX610 of FIG. 5. The fingerprint sensing circuit 116 generates the fingerprint image FPI_1 according to raw data of the fingerprint sensing signal S3 by a data remapping operation. The raw data of the fingerprint sensing signal S3 of FIG. 6 includes a plurality of fingerprint image segments FPI_11 and FPI_12. When the data remapping operation is performed, the fingerprint sensing circuit 116 rearranges the fingerprint image segments FPI_11 and FPI_12 to generate the fingerprint image FPI_1 according to an order of the fingerprint sensing lines RX341 to RX610.

To be specific, the fingerprint sensing lines RX341 to RX610 are selected for fingerprint sensing, and the fingerprint sensing lines RX341 and RX610 respectively serve as two boundaries of the fingerprint sensing zone. The fingerprint sensing signal S3 carried on the fingerprint sensing lines RX341 to RX610 is read out by the AFE circuit 163 at a time. The AFE circuit 163 receives the fingerprint sensing signal S3 from the fingerprint sensing lines RX341 to RX610 in a single-turn receiving manner. That is to say, the AFE circuit 163 receives the fingerprint sensing signal S3 from all of the selected fingerprint sensing lines RX341 to RX610 at once during the same fingerprint sensing phase. After signal conversion operation, the AFE circuit 163 transmits the fingerprint sensing signal S3 from the fingerprint sensing channels CH1 to CH270 to the digital circuit 161 of FIG. 3. In the present embodiment, the AFE circuit 163 of the fingerprint sensing circuit 116 may be designed to have 270 fingerprint sensing channels, and the number of the fingerprint sensing lines is 1080, i.e. RX1 to RX1080. The number of the fingerprint sensing lines and the number of the fingerprint sensing channels are disclosed for example, and the invention is not limited thereto.

The fingerprint image segment FPI_11 is sensed via the fingerprint sensors connected to the fingerprint sensing lines RX341 to RX540 and transmitted to the fingerprint sensing channels CH71 to CH270. The fingerprint image segment FPI_12 is sensed via the fingerprint sensors connected to the fingerprint sensing lines RX541 to RX610 and transmitted to the fingerprint sensing channels CH1 to CH70. The fingerprint sensing circuit 116 rearranges the fingerprint image segments FPI_11 and FPI_12 to generate the fingerprint image FPI_1 according to the order of the fingerprint sensing lines RX341 to RX540 and RX541 to RX610 as depicted in FIG. 6, such that the fingerprint image segment FPI_12 is moved from the left side of the fingerprint image segment FPI_11 to the right side. As a result, the remapped fingerprint image FPI_1 is generated.

In addition, since the driving and sensing channels 102 do not receive the fingerprint sensing signals S3, the fingerprint image segments FPI_11 and FPI_12 include interlaced image stripes 600 as depicted in FIG. 6. The interlaced image stripes 600 do not include fingerprint information. Therefore, the fingerprint sensing circuit 116 further removes the interlaced image stripes 600 from the fingerprint image segments FPI_11 and FPI_12 when the fingerprint 116 sensing circuit rearranges the fingerprint image segments FPI_11 and FPI_12. That is to say, when the data remapping operation is performed, the interlaced image stripes 600 are removed from the raw data of the fingerprint sensing signal S3 at the same time to form the fingerprint image FPI_1. The width of the fingerprint image FPI_1 includes 200 pixel columns after the interlaced image stripes 600 are removed from the raw data of the fingerprint sensing signal S3.

Figure 7:
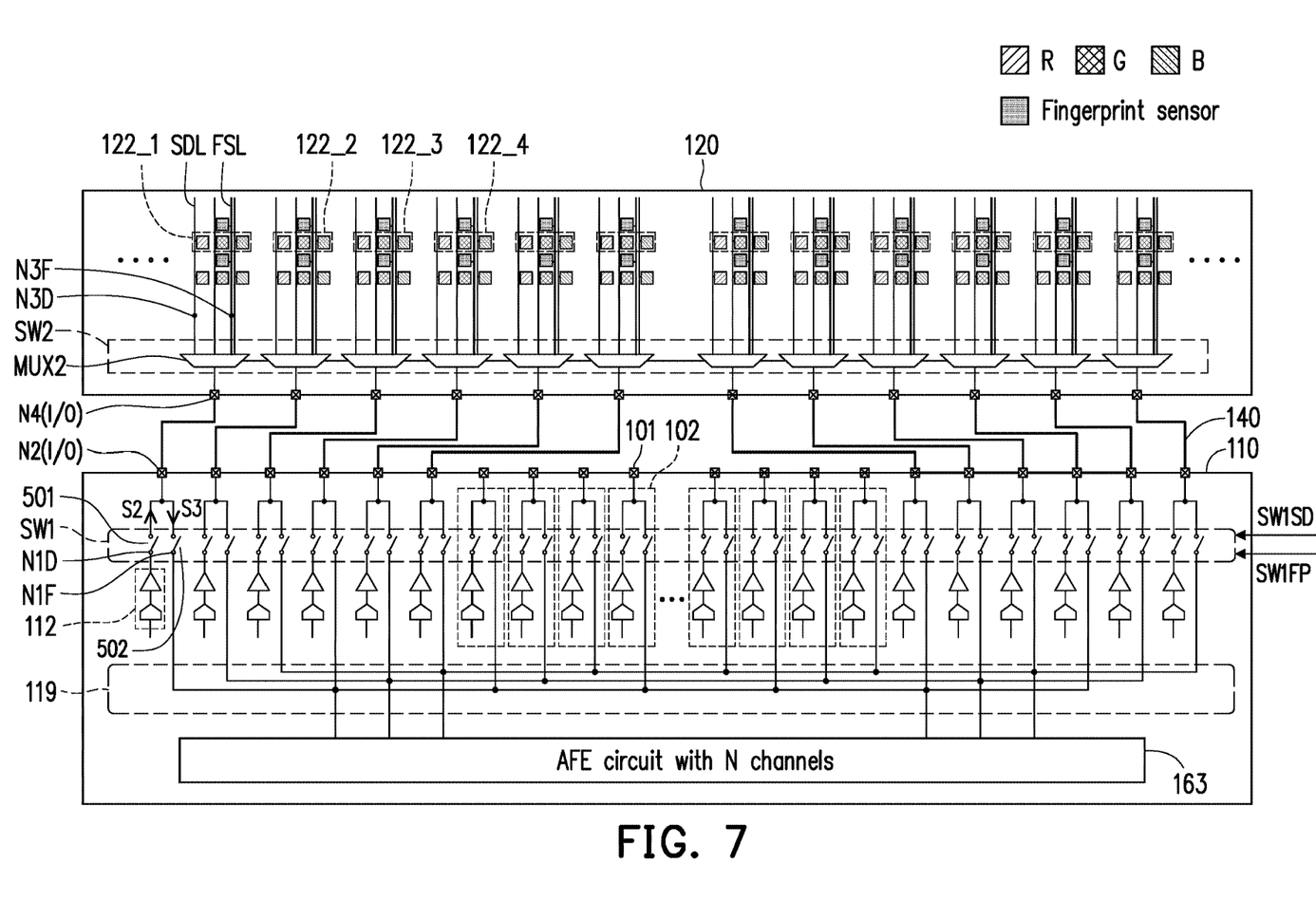
FIG. 7 is a schematic diagram illustrating a routing structure between the electronic circuit and the display panel according to another embodiment of the invention.

FIG. 7 is a schematic diagram illustrating a routing structure between the electronic circuit and the display panel according to another embodiment of the invention. Referring to FIG. 7, in the present embodiment, each pixel 122 of the display panel 120 includes a red sub-pixel R, a green sub-pixel G and a blue sub-pixel B. PPI of display is equal to DPI of fingerprint recognition in the present embodiment. The switch unit MUX2 is a 1:4 multiplexer, for example. In addition, the second part of the first pins N2, i.e. I/O pins 101, collectively distributes between the first part of the first pins N2. For example, the I/O pins 101 of the electronic circuit 110 that are not connected to the I/O pins N4 of the display panel 120 are assembled to the center part of the chip side, as shown in FIG. 7.

Figure 8:
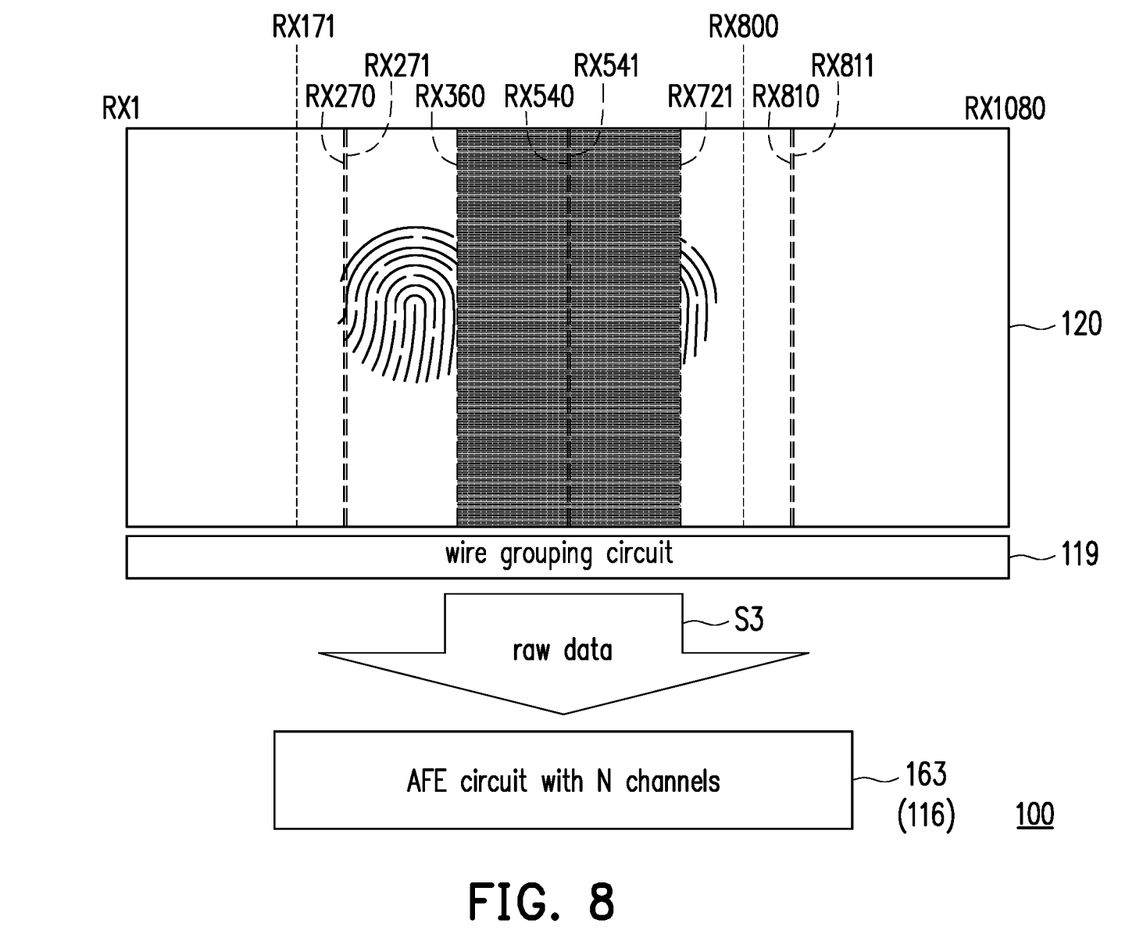
FIG. 8 and FIG. 9 are schematic diagrams illustrating the electronic device of FIG. 7 and a data remapping operation thereof according to an embodiment of the invention.
Figure 9:
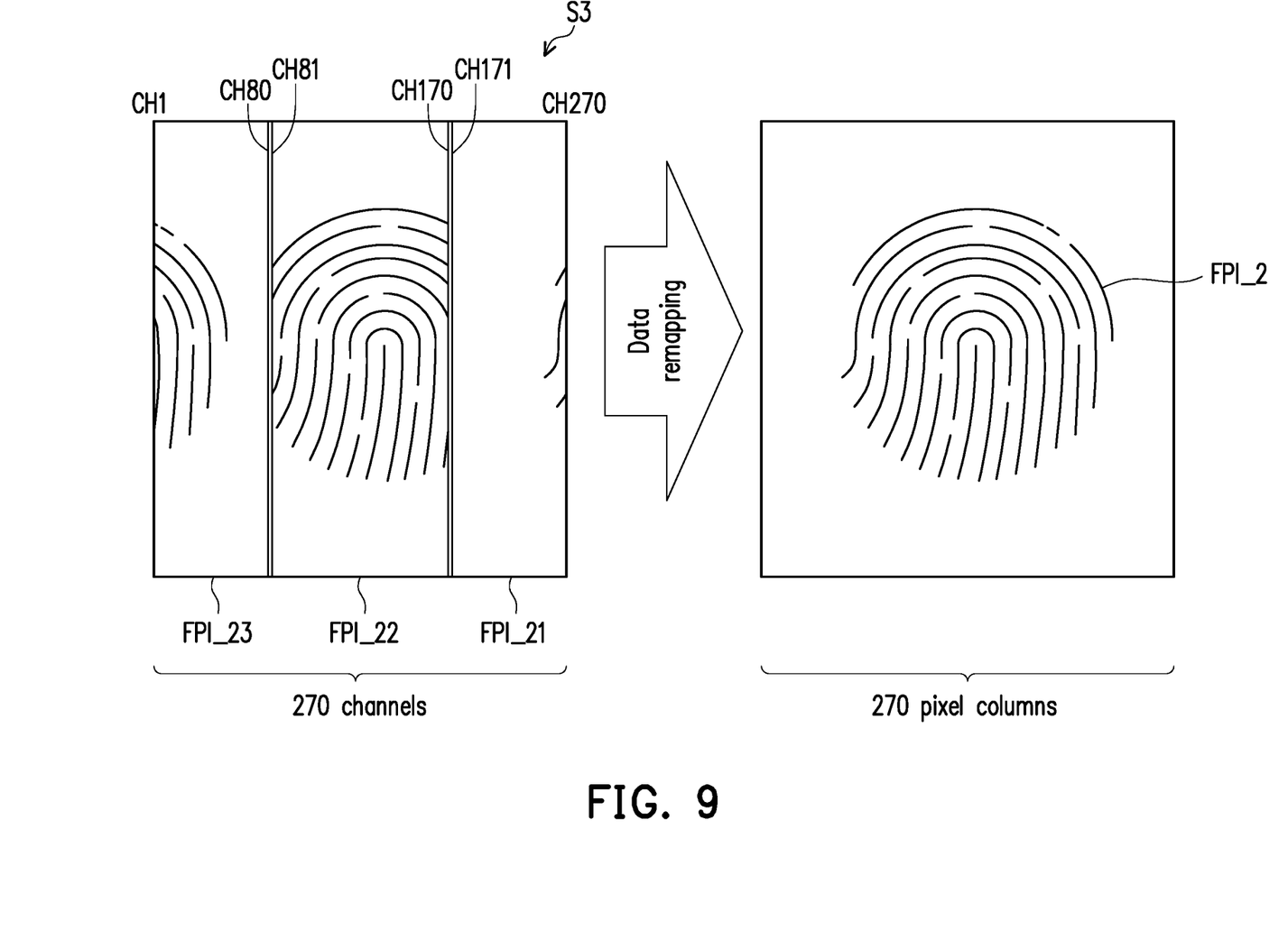

FIG. 8 and FIG. 9 are schematic diagrams illustrating a data remapping operation according to another embodiment of the invention. Referring to FIG. 7 to FIG. 9, the fingerprint sensing circuit 116 is configured to receive the fingerprint sensing signal S3 corresponding to a fingerprint image FPI_2 from the fingerprint sensing lines RX171 to RX800 of FIG. 8. The fingerprint sensing circuit 116 generates the fingerprint image FPI_2 according to raw data of the fingerprint sensing signal S3 by the data remapping operation. The raw data of the fingerprint sensing signal S3 of FIG. 9 includes a plurality of fingerprint image segments FPI_21, FPI_22 and FPI_23. The fingerprint image segments FPI_21, FPI_22 and FPI_23 do not include interlaced image stripes. When the data remapping operation is performed, the fingerprint sensing circuit 116 rearranges the fingerprint image segments FPI_21, FPI_22 and FPI_23 to generate the fingerprint image FPI_2 according to an order of the fingerprint sensing lines RX171 to RX800.

To be specific, the fingerprint sensing lines RX171 to RX360 and RX721 to RX800 are selected for fingerprint sensing, and the fingerprint sensing lines RX171 and RX800 respectively serve as two boundaries of the fingerprint sensing zone. The fingerprint sensing signal S3 carried on the fingerprint sensing lines RX171 to RX360 and RX721 to RX800 is read out by the AFE circuit 163 at a time. The AFE circuit 163 receives the fingerprint sensing signal S3 from the fingerprint sensing lines RX171 to RX360 and RX721 to RX800 in a single-turn receiving manner. That is to say, the AFE circuit 163 receives the fingerprint sensing signal S3 from all of the selected fingerprint sensing lines RX171 to RX360 and RX721 to RX800 at once during the same fingerprint sensing phase. After signal conversion operation, the AFE circuit 163 transmits the fingerprint sensing signal S3 from the fingerprint sensing channels CH1 to CH270 to the digital circuit 161 of FIG. 3.

The fingerprint image segment FPI_21 is sensed via the fingerprint sensors connected to the fingerprint sensing lines RX171 to RX270 and transmitted to the fingerprint sensing channels CH171 to CH270. The fingerprint image segment FPI_22 is sensed via the fingerprint sensors connected to the fingerprint sensing lines RX271 to RX360 and transmitted to the fingerprint sensing channels CH81 to CH170. The fingerprint image segment is sensed via the fingerprint sensors connected to the fingerprint sensing lines RX721 to RX800 and transmitted to the fingerprint sensing channels CH1 to CH80. The fingerprint sensing circuit 116 rearranges the fingerprint image segments FPI_21, FPI_22 and FPI_23 to generate the fingerprint image FPI_2 according to the order of the fingerprint sensing lines RX171 to RX270, RX271 to RX360 and RX721 to RX800 as depicted in FIG. 9. The fingerprint image segments FPI_21, FPI_22 and FPI_23 are remapping, such that the fingerprint image FPI_2 is generated.

Figure 10:
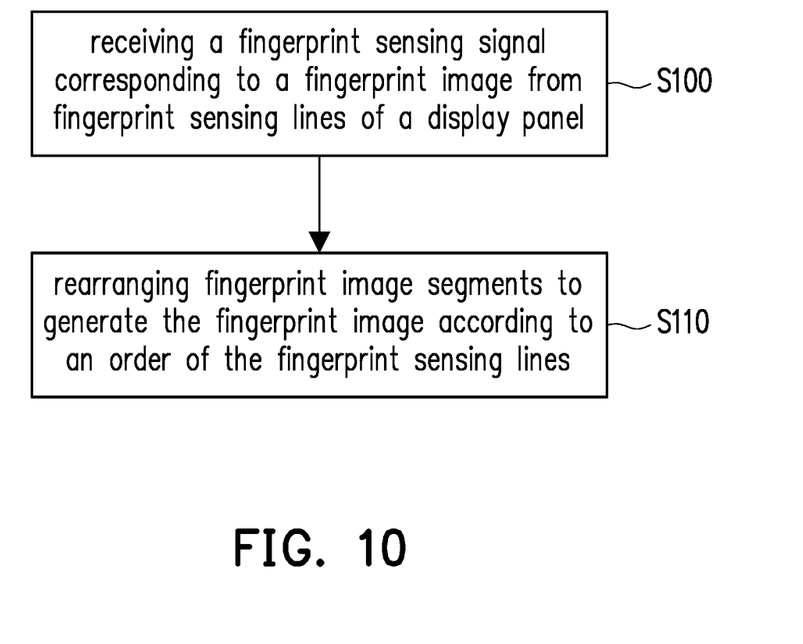
FIG. 10 is a flowchart illustrating steps in a method for generating a fingerprint image according to an embodiment of the invention.

FIG. 10 is a flowchart illustrating steps in a method for generating a fingerprint image according to an embodiment of the invention. Referring to FIG. 3 and FIG. 10, in the present embodiment, the method for generating the fingerprint image is at least adapted to the electronic device 100 depicted in FIG. 3, but the invention is not limited thereto. Taking the electronic device 100 for example, in step S100, the fingerprint sensing circuit 116 receives the fingerprint sensing signal S3 corresponding to the fingerprint image FPI_1 from the fingerprint sensing lines FSL of the display panel 120. The fingerprint sensing signal S3 includes a plurality of fingerprint image segments FPI_11 and FPI_12. In step S110, the fingerprint sensing circuit 116 rearranges the fingerprint image segments FPI_11 and FPI_12 to generate the fingerprint image FPI_1 according to an order of the fingerprint sensing lines FSL.

The method for generating the fingerprint image described in the embodiment of the invention is sufficiently taught, suggested, and embodied in the embodiments illustrated in FIG. 1 to FIG. 9, and therefore no further description is provided herein.

In summary, in the embodiments of the invention, the display driving signal and the fingerprint sensing signal are transmitted on the same transmission line in different phases. The transmission line is shared by the display driving signal and the fingerprint sensing signal. The electronic circuit outputs the display driving signal to the display panel and receives the fingerprint sensing signal from the display panel via the same pin connected to the transmission line. The routing between the electronic circuit and the display panel is simple. The width of the fan-out area corresponding to the electronic circuit and the frame border size of the display panel near the electronic circuit are small. In addition, a data remapping operation is performed on fingerprint image segments to generate a whole fingerprint image, and interlaced image stripes are also removed from raw data of the fingerprint sensing signals S3 at the same time.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic circuit, adapted to drive a display panel comprising a plurality of fingerprint sensing lines, the electronic circuit comprising:
a fingerprint sensing circuit, configured to receive a fingerprint sensing signal corresponding to a fingerprint image from the fingerprint sensing lines,
wherein the fingerprint sensing signal comprises a plurality of fingerprint image segments, and the fingerprint sensing circuit rearranges the fingerprint image segments to generate the fingerprint image according to an order of the fingerprint sensing lines.

2. The electronic circuit of claim 1, further comprising a plurality of first pins, wherein the display panel further comprises a plurality of second pins connected to a first part of the first pins via transmission lines, and a second part of the first pins is floating.

3. The electronic circuit of claim 2, wherein the fingerprint image segments comprise interlaced image stripes, and the fingerprint sensing circuit further removes the interlaced image stripes from the fingerprint image segments when the fingerprint sensing circuit rearranges the fingerprint image segments.

4. The electronic circuit of claim 3, wherein the interlaced image stripes do not comprise fingerprint information.

5. The electronic circuit of claim 2, wherein the second part of the first pins distributes between the first part of the first pins in an interlaced manner.

6. The electronic circuit of claim 2, wherein the second part of the first pins collectively distributes between the first part of the first pins.

7. The electronic circuit of claim 6, wherein the fingerprint image segments do not comprise interlaced image stripes.

8. A method for generating a fingerprint image, comprising:
receiving a fingerprint sensing signal corresponding to a fingerprint image from fingerprint sensing lines of a display panel, wherein the fingerprint sensing signal comprises a plurality of fingerprint image segments; and
rearranging the fingerprint image segments to generate the fingerprint image according to an order of the fingerprint sensing lines.

9. The method for generating the fingerprint image of claim 8, wherein the fingerprint image segments comprise interlaced image stripes, and the method further comprises:
removing the interlaced image stripes from the fingerprint image segments when the fingerprint image segments are rearranged.

10. The method for generating the fingerprint image of claim 9, wherein the interlaced image stripes do not comprise fingerprint information.

\* \* \* \* \*